United States Patent [19]

Young

[11] 4,386,595
[45] Jun. 7, 1983

[54] AIR TREATING DEVICE FOR FUEL BURNING ENGINES

[76] Inventor: James W. Young, 2513 Oakwood Dr., Grand Prairie, Tex. 75051

[21] Appl. No.: 85,908

[22] Filed: Oct. 18, 1979

[51] Int. Cl.³ ............................................ F02M 27/00
[52] U.S. Cl. .................................... 123/539; 123/536
[58] Field of Search ................. 123/556, 588, 539, 536

[56] References Cited

U.S. PATENT DOCUMENTS

| 1,257,053 | 2/1918 | Warman . | |
|---|---|---|---|
| 1,347,043 | 7/1920 | Justice et al. | 123/556 |
| 1,391,630 | 9/1921 | Hales et al. | |
| 1,459,306 | 6/1923 | Kodama . | |
| 1,529,351 | 3/1925 | Grooms . | |
| 1,614,234 | 1/1927 | de Trairun et al. | |
| 1,680,537 | 8/1928 | Grooms . | |
| 1,725,661 | 8/1929 | McPartland . | |
| 1,727,919 | 9/1929 | Weckerle | 123/536 |
| 1,873,746 | 8/1932 | English . | |
| 1,914,063 | 6/1933 | Barbarou . | |
| 1,982,484 | 1/1934 | Runge . | |
| 2,074,083 | 3/1937 | Eden . | |
| 2,116,718 | 5/1938 | Stubbs . | |
| 2,369,937 | 2/1945 | Baster | 123/556 |
| 2,576,450 | 11/1951 | de Marval . | |
| 2,756,730 | 7/1956 | Patchan . | |
| 2,960,975 | 11/1960 | Bergstrom . | |
| 3,124,525 | 3/1964 | Remonte . | |
| 3,157,172 | 11/1964 | Mittelstaedt . | |
| 3,476,095 | 11/1969 | Laubarede . | |
| 3,537,829 | 11/1970 | Ott . | |
| 3,678,908 | 7/1972 | Ito . | |
| 3,841,824 | 10/1974 | Bethel . | |
| 3,943,407 | 3/1976 | Bolasny . | |
| 4,005,683 | 2/1977 | Whitt . | |
| 4,020,815 | 5/1977 | Hubert | 123/556 |
| 4,043,308 | 8/1977 | Cerkanowicz | 123/536 |
| 4,047,511 | 9/1977 | Takagi . | |
| 4,047,512 | 9/1977 | Hough et al. | |
| 4,064,852 | 12/1977 | Fulenwider, Jr. | |
| 4,065,919 | 1/1978 | Eknayan . | |
| 4,157,700 | 6/1979 | Conner . | |
| 4,195,606 | 4/1980 | Wallis, Jr. et al. | 123/539 |

FOREIGN PATENT DOCUMENTS

| 673253 | 10/1963 | Canada | 123/539 |
|---|---|---|---|
| 832816 | 5/1937 | France . | |
| 269808 | 4/1927 | United Kingdom | 123/539 |

Primary Examiner—Donald H. Lazarus
Attorney, Agent, or Firm—John S. Roberts, Jr.

[57] ABSTRACT

Exhaust pollutants of a vehicle are reduced by providing dry, substantilly moisture-free air which is mixed with the fuel. The conventional air filter is removed and replaced by a housing containing a plurality of sealed glass tubes having inert gas therein which treats the air by subjecting it to ultraviolet rays and additional heat. The air has been initially heated to remove the moisture and subjected to an ultraviolet treatment before it reaches the housing.

9 Claims, 4 Drawing Figures

AIR TREATING DEVICE FOR FUEL BURNING ENGINES

BACKGROUND OF THE INVENTION

The present invention pertains to the reduction of pollutants into the atmosphere by vehicles. Due to increasing government regulations many different approaches have been taken to comply with the same and these include various treatments of both the fuel and the air and their mixture to provide a more complete combustion to reduce the discharge of nitrous oxides, hydrocarbons and other impurities into the atmosphere.

The known devices attempting to effect these changes include the atomization of the gasoline into fine particles, the heating and cooling of the same, the treatment of the exhaust before its discharge and combinations of the same. Any, and all of the above require the addition of components to the vehicle which, in turn, require more expense and care without, in many instances, any significant change in the quality of exhaust discharged.

SUMMARY OF THE INVENTION

This invention relates to apparatus added to a vehicle which draws atmospheric air into an intake, and sequentially subjects it to ultraviolet rays, heats it to a temperature which removes the moisture therefrom and conducts it to a housing, which supplants the conventional air filter whereat it is additionally subjected to heat and ultraviolet rays before being induced into the carburetor.

The apparatus for effecting the above includes a main conduit means having one end secured to an opening in the vehicle body and having its other end secured to the housing mentioned above. The conduit includes a fan housing and fan for drawing the air therein, an ultraviolet ray treating section, a moisture removing section comprised of a plurality of individual tubes which are effective for breaking the air into separate streams which can be more effectively worked upon, controlled heating means for the tubes, a smaller tube including a normally closed valve which permits the addition of air when needed, and a housing which includes a plurality of sealed glass tubes conforming in shape to that of the housing, and which include different inert gases electrically connected generators which cause the same to produce ultraviolet light and heat. Thus, the air is treated to remove the moisture therefrom, if any, and is converted to a vapor which is expanding due to its lightness to facilitate its mixing with the fuel to thereby enhance the charge fed to the cylinders to produce a combustible explosion having its exhaust free from pollutants. It is seen, then, that this end result is obtained in a very simple and efficient manner which includes the addition of a minimum amount of parts which do not appreciably increase the overall weight of the vehicle nor does it increase the maintenance thereof since there are no moving parts. The device can be readily installed and maintained with a minimum amount of care.

DESCRIPTION OF THE PREFERRED EMBODIMENT

Figure 1:
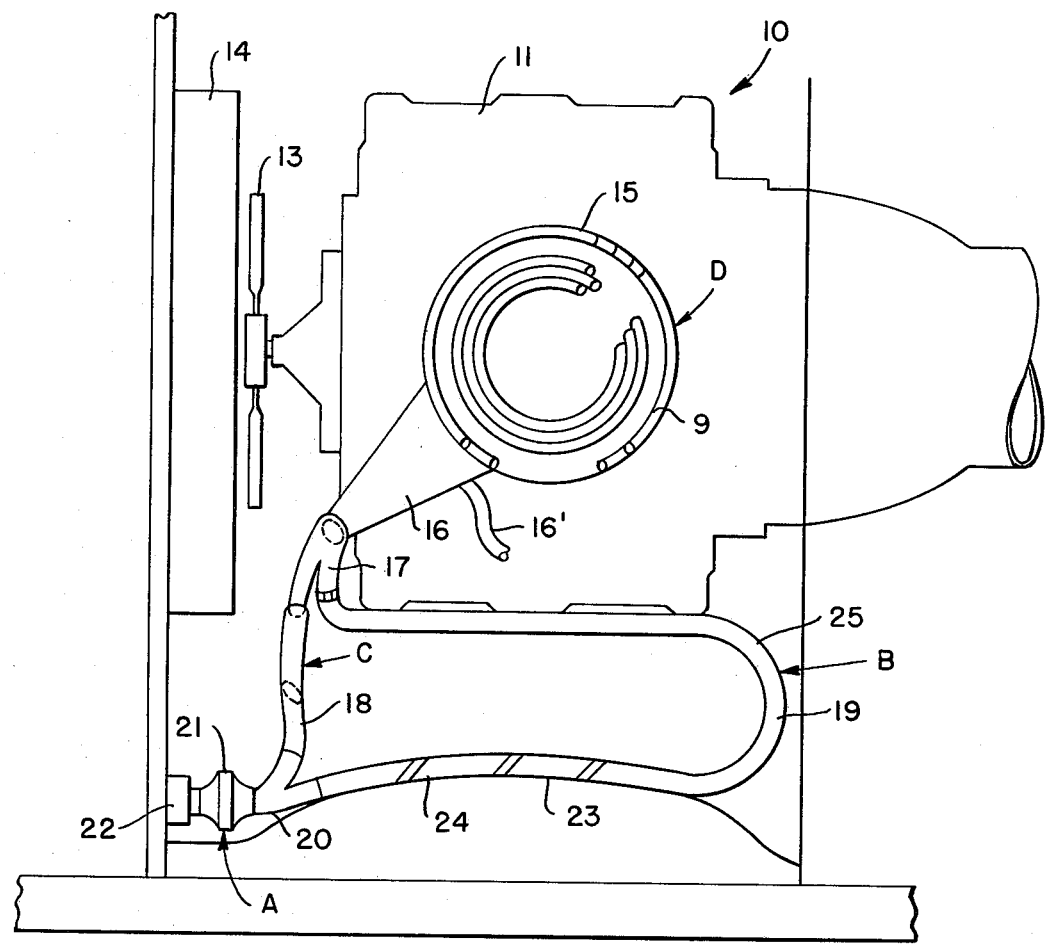
FIG. 1 is a top view of a vehicle engine showing the device installed and its relationship with respect to the same.
Figure 2:
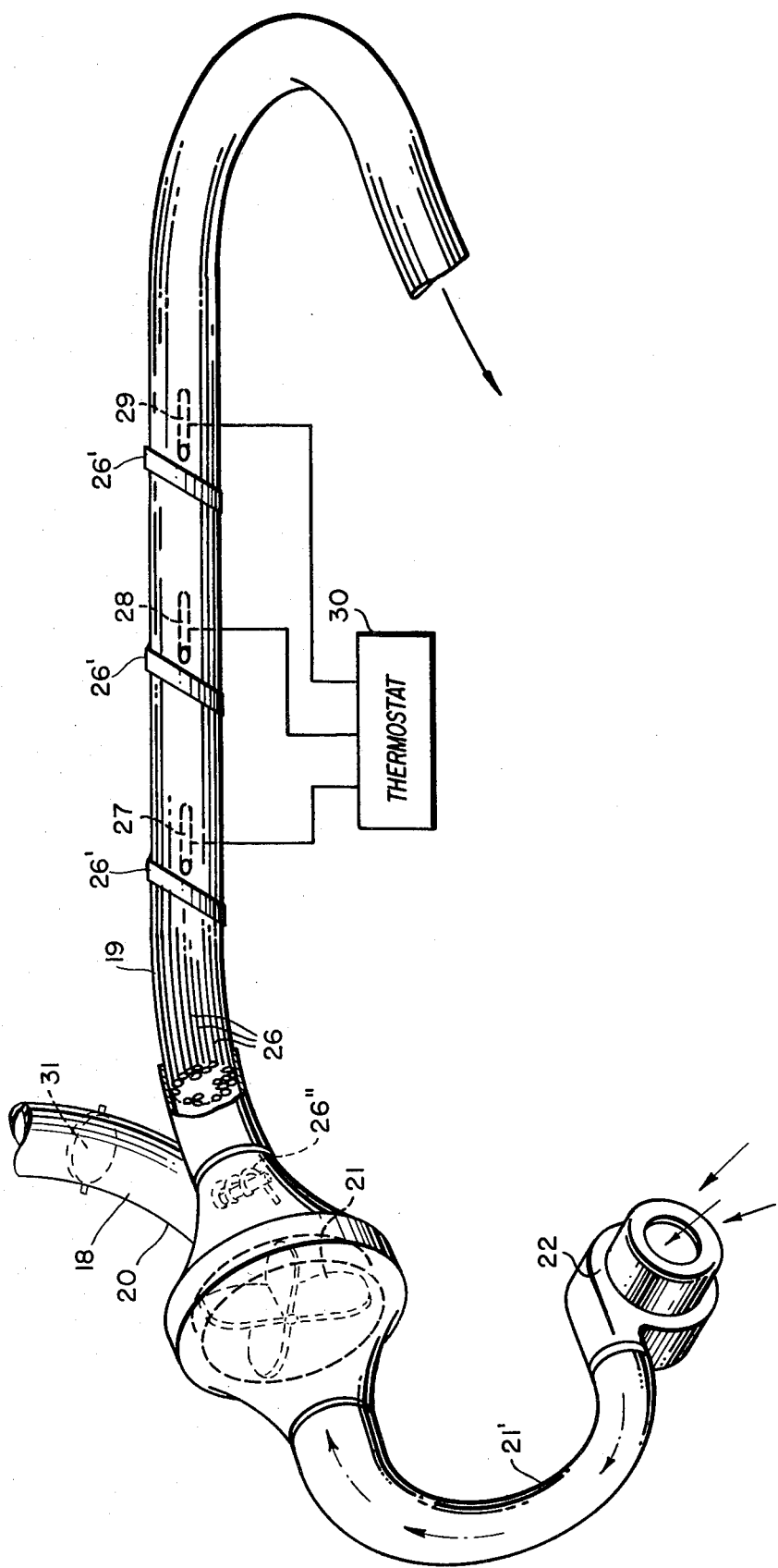
FIG. 2 is a view showing the details of the air induction means.
Figure 3:
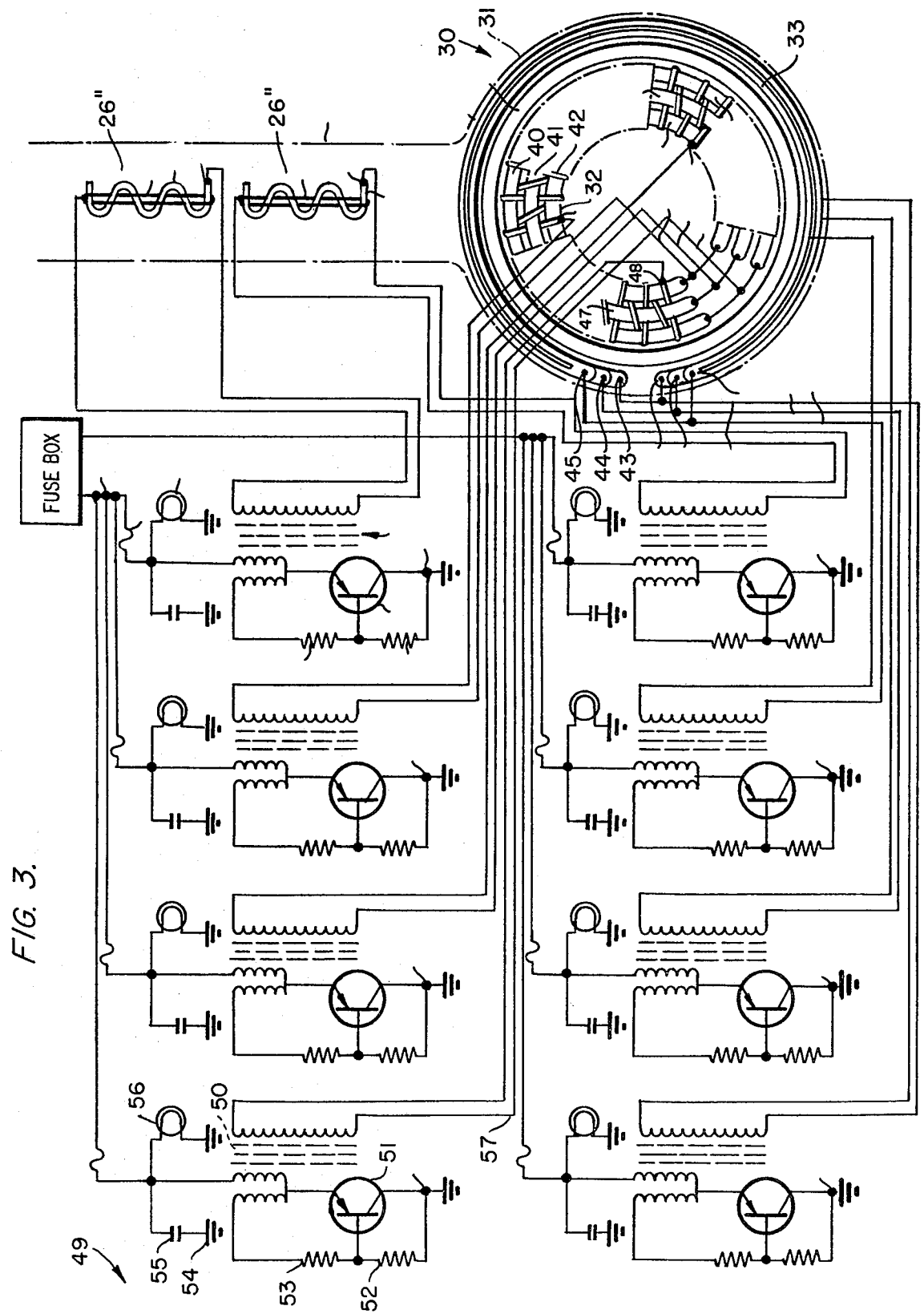
FIG. 3 shows the device and its detailed connection to the power generators.

With reference to FIGS. 1 and 2, the component parts A, B, C and D of the present invention are seen to be mounted within the vehicle engine housing 10 which includes an engine block 11, fan 13 and radiator 14. The component parts of the system include the air induction and preliminary treating means A, the main conduit B, the additional air conduit C, and the main air treatment housing D. The main treatment station D comprises a housing 15 having an air inlet 16 communicating at one end to the interior thereof and at the other end with a V-shaped connector 17 having conduits 18, 19, parts C and B, extending from each leg thereof. Conduits 18, 19 are joined at their other ends to form a single coupling 20 housing a blower 21 connected by a flexible hose 21' to an atmospheric air entrance means 22. As seen in FIG. 3, air entrance means 22 comprises a housing having its opening disposed in a plug-like member which facilitates its insertion into an aperture formed in the vehicle body. Conduit 19 forms the main passageway for the conducting of air to the housing D and is formed in the shape of a "U" with one leg 23 thereof disposed and secured adjacent the interior vehicle wall 24 and the other leg 25 secured adjacent to the engine block 12. As seen, conduit 18 is of a shorter length and directly connects couplings 17,20.

Further details of the conduits B, C are seen in FIG. 2 and as seen, main conduit 19 is formed of a plurality of individual copper or aluminum small diametered tubes 26 banded together by a plurality of spaced straps 26' (only 3 being shown) extending between the couplings 17 and 20. Heating elements 27, 28, 29 are disposed adjacent to or within the tubes 26 and are controlled by a thermostat 30. Thermostatic control means 30 automatically control the heaters 27, 28, 29 to regulate the temperature thereof in response to the temperature of the outside air, that is, when the outside air is cooler, the heating means will heat for a longer period of time as compared to when the outside temperature is warmer. Conduit 18 comprises a short tube joining the other legs of the couplings 17 and 20 and has a normally closed bypass valve 31 disposed medially thereof which is effective to open automatically in response to the temperature of the engine air to permit the addition of atmospheric air to assist in cooling to avoid overheating, if needed. Also, in extremely hot, dry air conditions, the main conduit 19 is assisted by air conducted directly to treatment station D via short conduit 18 which valve is opened in response to the thermostat.

Immediately preceding the tubes 26 is a pre-treatment station comprised of a pair of sealed glass tubes or envelopes 26', 26' having a charge of inert gas therein. These envelopes 26', 26' are electrically connected to a generator power source and serves to condition the air prior to its being dispersed into the individual tubes 26.

It is therefore seen that the function of the component parts A, B and C is to draw atmospheric air into the conduit, passing it by the sealed envelopes 26', 26' which initially treats it, then introducing it into the plurality of individual tubes 26 whereat it is heated to remove moisture by vaporizing it prior to its further treatment at station D which will be explained hereinafter. The optimum temperature of the air is controlled both by the heaters associated with the conduit means which are associated with sensors indicating the temperature of the atmospheric air, the exhaust gas, the engine temperature, etc., to thereby determine the amount of heat that has to be added to the incoming air to effect vaporization of the moisture. The elongated length of conduit 19 and therefore, the individual tubes 26, causes the air to travel over a longer path before it reaches the treatment station D to effectively control the heating and the vaporization of the moisture therein.

Figure 4:
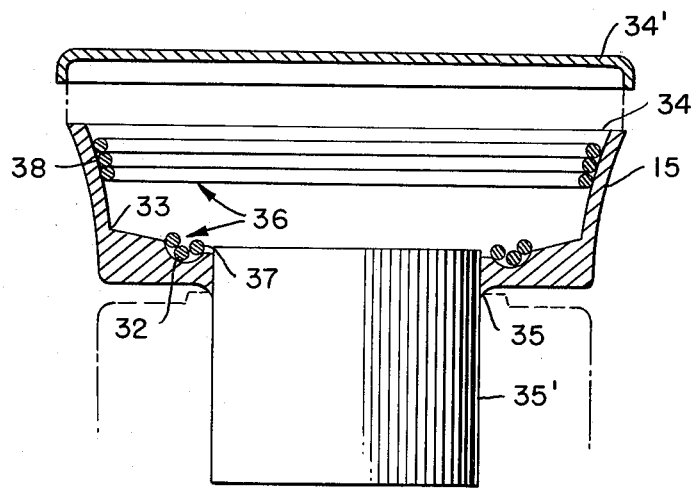
FIG. 4 shows the details of the housing and the glass envelopes disposed therein.

The details of the main treatment station D are seen in the exploded view of FIG. 4 and includes a generally circular cup-shaped housing 15 having stepped interior recesses 32, 33 disposed therearound, an open top 34, and a small discharge opening 35 in the base thereof. The housing 15 is secured to the top of the carburetor, not seen, with the opening 35 leading directly into the interior thereof, or alternatively, can be connected thereto by any suitably shaped adapter such as shown at 35, 35'. These adapters can take any shape to effect the joining of the housing 15 to the carburetor. The open end 34 is closed by a cover 34' snapped thereon or secured in any desirable fashion. A plurality of sealed tubes or envelopes 36 are positioned in the respective recesses 32, 33.

In one preferred arrangement, the tubes 36 are bunched or nested together as shown at 37 and stacked one on top of the other as seen at 38, and secured to the housing 15 in any convenient manner. This disposition provides a surface area substantially covering the interior of the housing 15 to insure that all the air is expanded and treated.

The tubes 36 contain charges of inert gas which can be selected from one or more of helium, neon, argon, krypton and xenon. Mercury is also selectively utilized in combination with these gases. By choosing specific types of glass to form the tubes or envelopes and charging these with selected gases, either ultra-violet rays or heat will be caused to be discharged by the same when electrically connected to a power source.

The purpose of the charged tubes is to emit rays and heat to cause the previously dried air to become chemically unstable whereby the same will co-act with the unburned gas particles emanating from the manifold and being introduced into the inlet 16 from the tube 16' leading from the exhaust manifold as seen in FIG. 1. As the air cascades downwardly over the tubes, the rays and heat causes the oxygen molecules to disperse thereby increasing the available oxygen which enhances and facilitates the burning of the fuel as it passes downwardly into the carburetor. In other words, the expanding and continuous motion of the oxygen molecules lengthen the burning time of the mixture due to the availability thereof to cause a more complete burning of the mixture which, in turn, will reduce the amount of pollutants discharged into the atmopshere, and, since the combustion is that much more complete the engine's demand for fuel will be reduced to increase the miles per gallon.

Therefore, with these desirous end results in mind, tubes 40, 41 of the bunched tubes 37 contain neon gas with tube 40 being made from lime glass and tube 41 from unleaded glass such as Vycor 7913TM made by Corning Glass. The function of each of these tubes is to generate heat which changes the weight of the air by expanding it by further reducing the humidity, if any, contained therein. Tubes 43, 44 of the stacked tubes contain neon gas and function in the same manner as tubes 40, 41. Tubes 42 and 45 are made from lime glass and each contain argon gas with mercury and are effective to emit ultraviolet rays which cause the movement of the oxygen molecules referred to hereinabove. As mentioned before, other inert gases could be used, such as krypton, and the selection in many cases is dependent on the cost and availability of the same. Also, various combinations and numbers of tubes can be utilized with the prime considerations being the size of the engine; and the general nature of the air where the vehicle is being used, that is, is the air dry or moist. In this regard, the sealed tubes 26', 26' immediately preceding the air conducting tubes 26 also contain charges of the inert gases described above to cause the emission of ultraviolet rays and heat to initially treat the air.

As further seen in FIG. 2, the tubes 40, 41, 42 are interconnected by a plurality of spaced sets 46 of individual wide braided wires which are threaded over and under these tubes in a FIG. 8 configuration so that each tube is contacted by the wire as it passes therearound. One end 47 of the wire 46 is anchored back on itself and the other end 48 is connected to one end of a power generator. When the wire is heated, it will be seen that by wrapping the tubes in this fashion there will be a feed back effect which will cause each of the tubes to be additionally heated due to its contact with the wire 46 as the primary tube is being heated. The wire braid also inherently serves to cushion the tubes within the housing 15.

With continuing reference to FIG. 3, the electrical connection of the envelopes to the power generator is seen to consist of a plurality of circuits, with only one being described, as they are all basically the same. As seen, end 48 of the braided wire extends to a power generator, shown generally at 49 which is a conventional feed back transistorized circuit including a transformer 50, transistor 51, series resistors 52, 53, ground 54, fuse 55, indicator lamp 56 and return lead 57 extending to the wire connecting the ends of tube 42.

These circuits are in turn electrically connected to the vehicles ignition system and are energized upon actuation of the ignition key and once the same are fired the telltale lights 56 will burn indicating to the driver the on condition of each of the generators.

The above circuitry can be placed in a single box using one common ground and a single positive connection to facilitate installation and removal for repair and maintenance thereof.

I claim:

1. Apparatus for decreasing the amounts of pollutants discharged by a fuel driven engine comprising air intake means, means comprising a plurality of individual conduits segregating the air into a plurality of streams for conducting the air to a treatment station, heating means and temperature controlling means regulating the heat discharged by the heating means acting on the air on its way to said treatment station, said treatment station including a cup-shaped housing having its interior wall recessed in a stepped fashion, a plurality of sets of at least two sealed glass tubes with one being of a lime type and the other of an unleaded nature and containing inert gas with one being capable of emitting ultraviolet rays and the other being capable of emitting heat, said sets being bunched together and wrapped at spaced intervals by a wire wrapped therearound in a figure eight configuration over and under the individual tube thereof, said wires being connected to a power generating circuit causing the wires and tubes to be heated whereby the specific wrapping thereof will increase the heat of each to enhance the movement of the gas therein, said sets being received in respective ones of said recesses of said interior wall and conforming in shape thereto and an outlet through which the treated air passes.

2. The apparatus of claim 1 wherein the power generating means is a transistorized circuit electrically connected to a respective tube controlled by the vehicle ignition system.

3. The apparatus of claim 2 wherein a transistorized circuit is provided for each tube.

4. The apparatus of claim 3 wherein each circuit has a telltale light means indicating the operating condition of the same.

5. The apparatus of claim 4 wherein the air intake means includes a fan for drawing air therein.

6. The apparatus of claim 5 wherein the air intake means is provided with an air conducting tube directly connected to the housing whereby additional air can be introduced to avoid overheating of the engine.

7. The apparatus of claim 6 wherein the temperature controlling means maintains the incoming air at a temperature sufficient to vaporize the same and includes sensing means to determine the ambient temperature for purposes of comparing one to the other.

8. The apparatus of claim 7 wherein a plurality of small individual conduits are provided for dividing the air into a plurality of streams.

9. The apparatus of claim 8 wherein the intake means includes an air pretreatment station forward of said plurality of conduits and comprises sealed envelopes of inert gas electrically connected to said power source.

* * * * *